May 29, 1934. J. V. EMMONS Re. 19,182

DRILL AND LIKE IMPLEMENT AND METHOD OF MAKING SAME

Original Filed Feb. 20, 1929 6 Sheets-Sheet 1

INVENTOR.

Joseph V. Emmons

BY

Fay, Oberlin & Fay

ATTORNEYS.

May 29, 1934. J. V. EMMONS Re. 19,182

DRILL AND LIKE IMPLEMENT AND METHOD OF MAKING SAME

Original Filed Feb. 20, 1929 6 Sheets-Sheet 2

INVENTOR.

Joseph V. Emmons

BY

Fay, Oberlin & Fay

ATTORNEYS.

DRILL AND LIKE IMPLEMENT AND METHOD OF MAKING SAME

Original Filed Feb. 20, 1929 6 Sheets-Sheet 3

INVENTOR.
Joseph V. Emmons
BY
Fay, Oberlin & Fay
ATTORNEYS.

DRILL AND LIKE IMPLEMENT AND METHOD OF MAKING SAME

Original Filed Feb. 20, 1929 6 Sheets-Sheet 4

INVENTOR.
Joseph V. Emmons
BY
Fay, Oberlin & Fay
ATTORNEYS.

DRILL AND LIKE IMPLEMENT AND METHOD OF MAKING SAME

Original Filed Feb. 20, 1929 6 Sheets-Sheet 5

INVENTOR.
Joseph V. Emmons
BY
Fay, Oberlin & Fay
ATTORNEYS.

DRILL AND LIKE IMPLEMENT AND METHOD OF MAKING SAME

Original Filed Feb. 20, 1929 6 Sheets-Sheet 6

INVENTOR.
Joseph V. Emmons
BY
Fay, Oberlin & Fay
ATTORNEYS.

Reissued May 29, 1934

Re. 19,182

UNITED STATES PATENT OFFICE 19,182

DRILL AND LIKE IMPLEMENT AND METHOD OF MAKING SAME

Joseph V. Emmons, Shaker Heights, Ohio, assignor to The Cleveland Twist Drill Company, Cleveland Ohio, a corporation of Ohio Original No. 1,847,302, dated March 1, 1932, Serial No. 341,324, February 20, 1929. Application for reissue September 13, 1933, Serial No. 689,304

2 Claims. (Cl. 77—70)

The present invention relates to composite drills, and its primary object, broadly stated, is to provide certain improvements in the construction of such drills.

More specifically, my invention contemplates providing a drill having a body consisting of some such material as high-speed steel, tool steel, high-carbon steel, or air-hardening steel, and inserted or attached cutting means consisting of some such material as an alloy of tungsten carbide. It is further contemplated that such inserts or attachments shall be so positioned or arranged as to effect nearly all of the cutting, but in cases where such is desirable, provision is made for distributing the cutting function between the inserts or attachments and the body. Also such cutters are shaped and attached in such a manner that little or none of their material is unavailable for use in the forming of cutting edges, and in all cases the junctures between the bodies and their attachments are so made that the properties of both materials can be used to the best advantage. The use of the above mentioned body materials is advantageous in that their properties can be materially improved by heat treatments, and the tools herein illustrated are so constructed that such heat treatments may be effected either prior to, during or subsequent to the operation by which the tips or cutters are secured in place with relation to the body.

The drills which I have provided are particularly adapted for the forming of holes in materials of a hard or abrasive nature, and in making the combinations hereinafter more fully described due regard has been given to the relatively expensive character of the cutters which are associated with the body, and in all cases such cutters have been shaped and secured with a view to obtaining a maximum of efficiency and durability for the completed tools.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but some of various mechanical forms in which the principle of the invention may be used.

In said annexed drawings:—

Figures 1, 2:
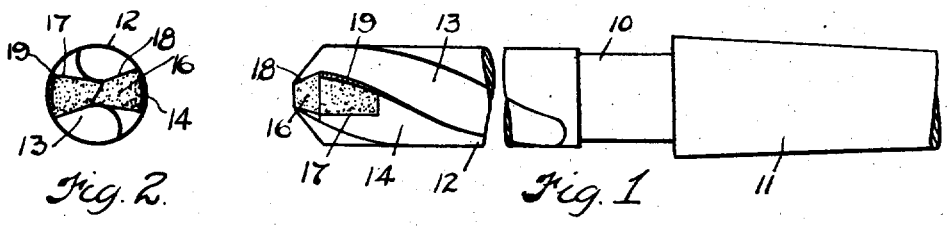
Figures 3, 4:
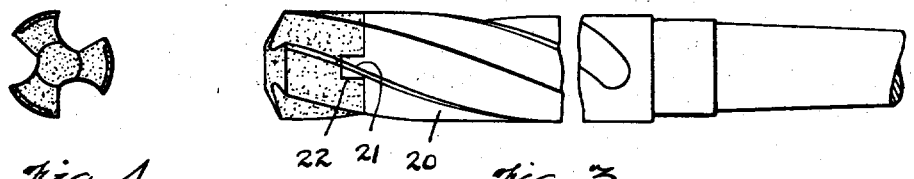
Figures 5, 6:
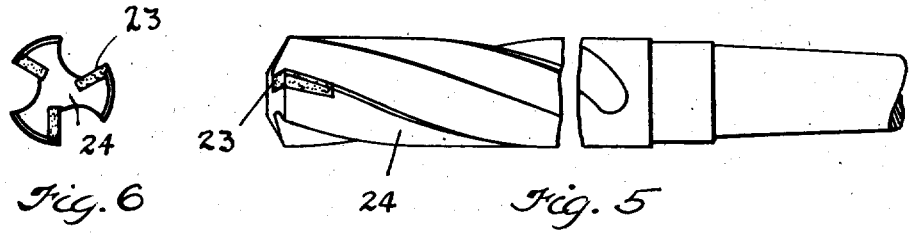
Figures 7, 8:
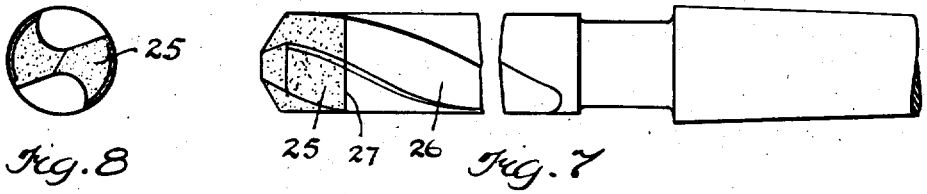
Figures 9, 10:
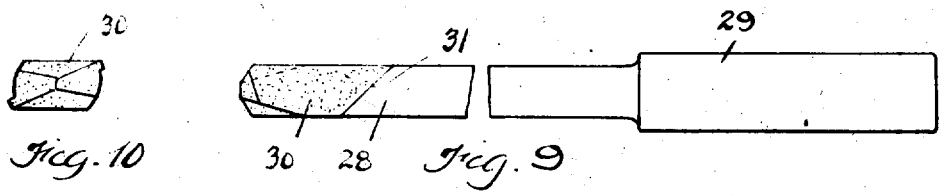
Figure 11:
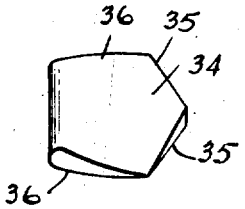
Figure 12:
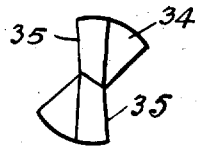
Figure 13:
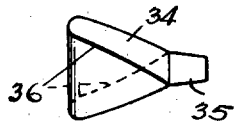
Figure 14:
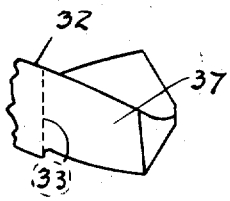
Figure 15:
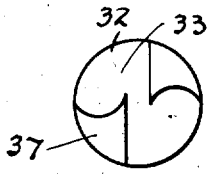
Figure 16:
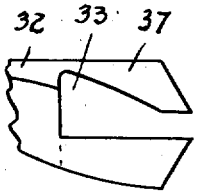
Figure 17:
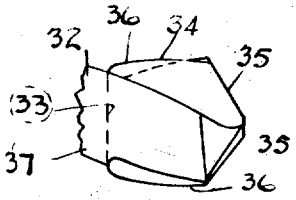
Figure 18:
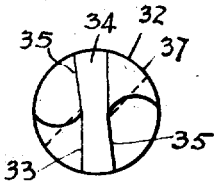
Figure 19:
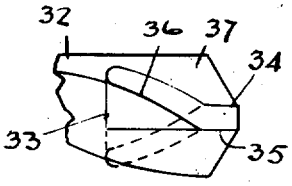
Figure 20:
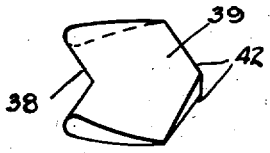
Figure 21:
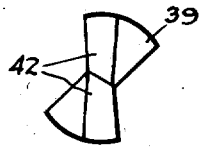
Figure 22:
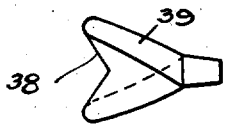
Figure 23:
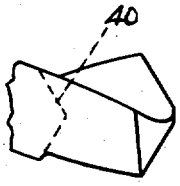
Figure 24:
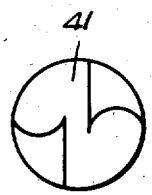
Figure 25:
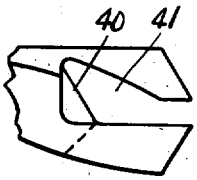
Figure 26:
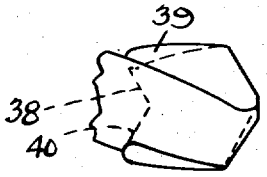
Figure 27:
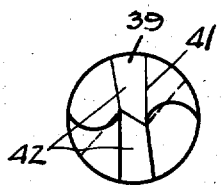
Figure 28:
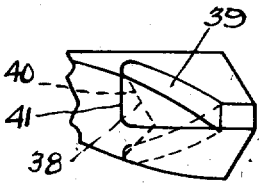
Figure 29:
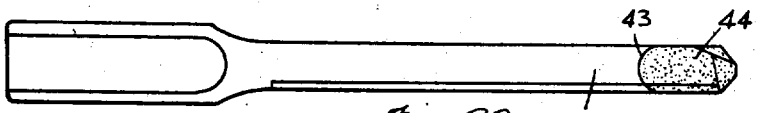
Figure 30:
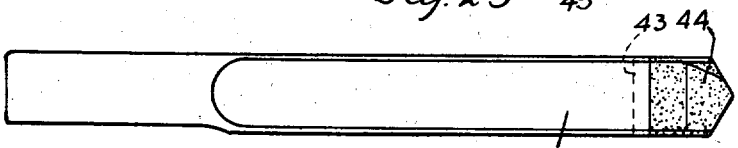
Figure 31:
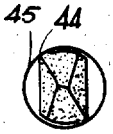
Figure 32:
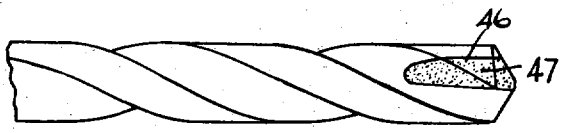
Figure 33:
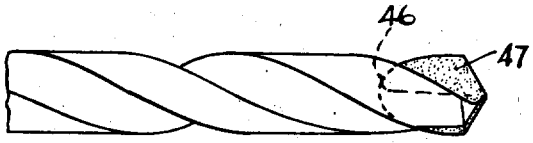
Figure 34:
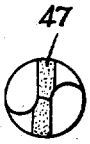
Figure 37:
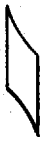
Figure 35:
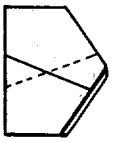
Figure 36:
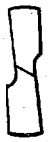
Figure 38:
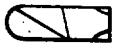
Figure 39:
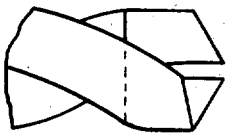
Figure 40:
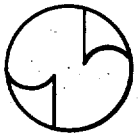
Figure 41:
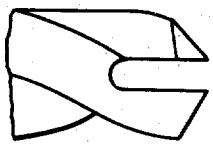
Figure 42:
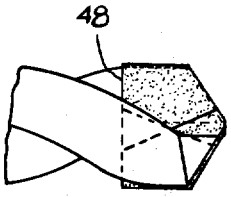
Figure 43:
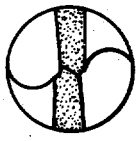
Figure 44:
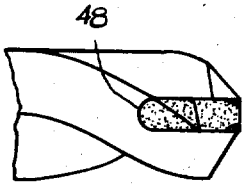
Figure 45:
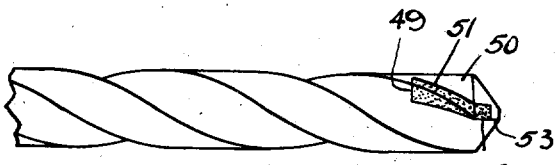
Figure 46:
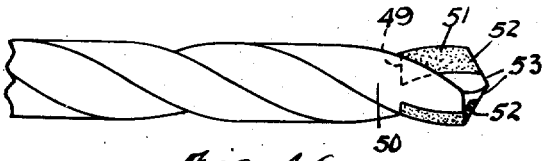
Figure 47:
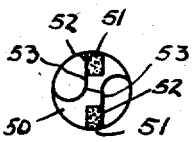
Figure 48:
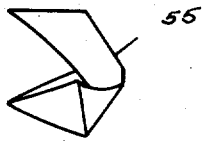
Figure 49:
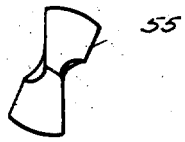
Figure 50:
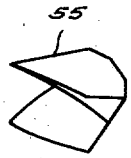
Figure 51:
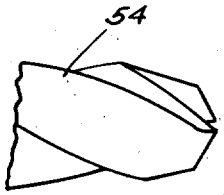
Figure 52:
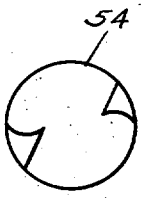
Figure 53:
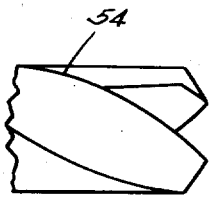
Figure 54:
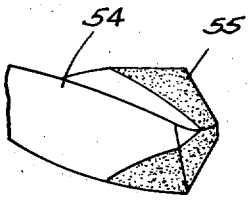
Figure 55:
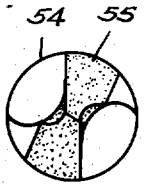
Figure 56:
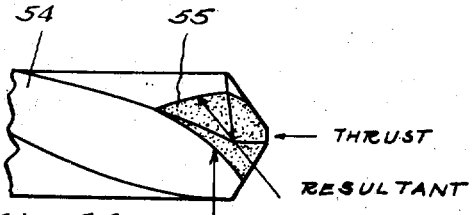

Figs. 1 and 2 are side and end elevational views of a twist drill which embodies the present improvements; Figs. 3 and 4 are side and end elevational views of another twist drill which likewise embodies the present improvements; Figs. 5 and 6 are side and end views of still another twist drill; Figs. 7 and 8 are side and end elevations of yet another twist drill; Figs. 9 and 10 are side and end elevations of a flat drill which embodies the present improvements; Fig. 11 is a side view of a twist drill insert; Fig. 12 is an end view of the insert shown in Fig. 11; Fig. 13 is a side view which was taken at right angles to the showing of Fig. 11; Fig. 14 is a side view of the active end of a twist drill body; Fig. 15 is an end view of the body shown in Fig. 14; Fig. 16 is a side view which was taken at right angles to the showing of Fig. 14; Fig. 17 is a side view which shows the parts of Figs. 11 and 14 assembly; Fig. 18 is an end view of the tool shown in Fig. 17 and corresponds with the parts shown in Figs. 12 and 15; Fig. 19 is a side view which was taken at right angles to the showing of Fig. 17 and corresponds with the parts shown in Figs. 13 and 16; Figs. 20 to 28 inclusive, correspond to Figs. 11 to 19 inclusive, and show a modification; Figs. 29 and 30 and 31 are side, plan and end view of another flat drill which embodies the present improvements; Figs. 32, 33 and 34 are side and end views of another twist drill; Fig. 35 is a plan view of an insert or cutter; Figs. 36, and 37 are end views of the insert shown in Fig. 35; Fig. 38 is a side view of the insert shown in Fig. 35; Fig. 39 is a side view of the active end of a twist drill body; Fig. 40 is an end view of the body shown in Fig. 39; Fig. 41 is a side view which was taken at right angles to the showing of Fig. 39; Fig. 42 is a side view which shows the parts of Figs. 35 and 39 in assembly; Fig. 43 is an end view of the tool shown in Fig. 42 and corresponds with the parts shown in Figs. 36 and 40; Fig. 44 is a side view which was taken at right angles to the showing of Fig. 42 and corresponds to the showings of Figs. 38 and 41; Figs. 45, 46 and 47 are side and end views of the active end of another twist drill; Fig. 48 is a side view of a twist drill cutter; Fig. 49 is an end view of the cutter shown in Fig. 48; Fig. 50 is a side view which was taken at right angles to the showing of Fig. 48; Fig. 51 is a side view of the active end of a twist drill body; Fig. 52 is an end view of the body shown in Fig. 51; Fig. 53 is a side view which was taken at right angles to the showing of Fig. 51; Fig. 54 is a side view of the parts of Figs. 48 and 51 in assembly; Fig. 55 is an end view of the assembly shown in Fig. 54 and corresponds with the showings of Figs. 49 and 52; and Fig. 56 is a side view which was taken at right angles to the showing of Fig. 54 and corresponds to the showings of Figs. 50 and 53.

The twist drill shown in Figs. 1 and 2 consists of a body 10 which includes a shank 11 and an operating portion 12. Such operating portion has the usual flutes and lands 13 and 14, and at its active end a cutting tip 16 is provided. This tip is secured in a transverse slot 17 and its forward and side edges 18 and 19 are adapted for respectively working upon the bottom and walls of the hole being drilled. The drill illustrated in Figs. 3 and 4 has a fluted body 20 which terminates in a tongue 21, and the attached cutting end has a groove 22 which, when engaged with such tongue, affords an additional means for resisting the torsional stresses to which the tool is subjected in use. If desired, the tongue may be formed upon the tip and a groove provided in the body. The twist drill shown in Figs. 5 and 6 is similar to that illustrated in the next two preceding views, but the cutters 23 are here shown as being individually secured to the lands 24, instead of being formed integrally with a tip which in effect constitutes a longitudinal extension of the body. The tip 25 of the drill illustrated in Figs. 7 and 8 is a distinct part which is attached to the body 26 by a layer of metal 27. Such tip is formed with the usual cutting edges, and its diameter is preferably about the same as the diameter of the body to which it is secured. The straight or flat drill shown in Figs. 9 and 10 consists of a body 28, a shank 29, and a cutting tip 30. This tip is provided with cutting edges, and at its plane of juncture with the body a layer of connecting metal 31 is interposed. In order to increase the areas upon which the operating stresses are effective, such plane of juncture between the tip and the body may be inclined in the manner shown.

Figs. 11 to 19 inclusive illustrate a twist drill wherein the active end of the fluted body 32 is provided with a slot or recess 33, and wherein the tip 34 is of helical form and of substantially uniform thickness. Such tip is provided with the cutting edges 35 and 36, and parts of its rearward portion are adapted for being secured to the lands 37. The recess 33 is so shaped that the tip 34 can be readily associated with the body, and when such tip is so associated, the tool shown in Figs. 17, 18 and 19 results. The twist drill illustrated in Figs. 20 to 28 inclusive differs from that shown in Figs. 11 to 19 inclusive in that the back edge 38 of the insert 39 and the bottom surface 40 of the slot or recess 41 are provided with complementally inclined surfaces which define an angle of about the same magnitude as the angle included between the end surfaces 42. This arrangement is more economical of the material of which the cutting insert is made and if desired, it may be employed instead of the right angled or perpendicular arrangement of the planes of juncture which are shown in Figs. 1 to 8 inclusive.

The straight drill shown in Figs. 29 to 31 inclusive is similar to some of the tools shown in the preceding figures in that the plane of juncture is formed between parts which are adapted for longitudinally interfitting with each other, but in the present case, such plane of juncture is curved as at 43 and the adjacent ends of the tip 44 and of the body 45 are respectively convex and concave.

The drill illustrated in Figs. 32 to 34 inclusive is similar to that shown in Figs. 1 and 2 except that the recess 46 is provided with a curved bottom (and of generally toric shape) which is complemental to the inner end of the cutter 47; and the drill shown in Figs. 37 to 44 inclusive is similar to the drill shown in Figs. 32 to 34 inclusive except that the plane of juncture 48 is curved only in a transverse direction. In all of these drills (Figs. 32 to 44 inclusive), the insert receiving recess may be formed with parallel side walls, and if such walls are so formed, the operations necessary to the slotting will be greatly simplified.

In Figs. 45 to 47 inclusive, the insert receiving recesses 49 are shown as being formed in the lands 50, and the cutters 51 are shown as being provided with edges 52 which function cooperatively with the edges 53. Such latter edges revolve more slowly when the tool is in use, and they therefore are not necessarily formed of the same material as the edges 52 which revolve more rapidly and remove more material.

In Figs. 48 to 56 inclusive, another drill which embodies the principles of my invention is illustrated. It consists of a body 54 and a cutting tip or attachment 55, the former being suitably shaped for interfitting with the latter and the juncture between these parts being so arranged that the greater part of their adjacent surfaces are disposed in a normal or substantially right angled relation to the resultant of the stresses caused by the combined torque and thrust produced when the tool is in operation. This method of locating the joint between the tip and the body not only greatly reduces any tendency towards separation of the connected parts but it also provides a greater area of contact and therefore greater strength. It will be apparent that the surfaces at the juncture may be either plane or curved and that the surfaces between the angularly disposed parts of the juncture on the opposite side of the tool may be either curved or plane as desired.

In all of the drills which have just been described, the body is made of one or another of the materials heretofore enumerated and the cutting inserts or attachments are made of a hard metal alloy. The joining of these parts may be effected in any desired manner as for instance by brazing or welding or otherwise, and when the assembly has been completed such finishing may be done as is necessary for preparing the tool for use. It will be apparent that various arrangements of the tongue and groove juncture above explained can be made; that in general the juncture can be effected between either plane or curved surfaces; that the tools to which my invention is applicable may have any desired number of flutes and lands; that such flutes and lands can be arranged in any desired relation to the inserts or attachments and the unions between them and the body; that any or no helix angles can be provided and that the helix angles of the working parts of the cutters can have any desired relation to the helix angles of the bodies; that the angularity of the working edges of the ends of the tool can be of any desired or practicable magnitude; that any of the "hard metal alloys" such as Widia metal and Carboloy may be used as a material for the cutters; that such cutters may be arranged for effecting all or only a part of the total cutting; that if desired the material of the body may be arranged for effecting part of the cutting; that the plane or curved surfaces of the junctures can bear any desired relation to the longitudinal axis of the tool; that the back ends of the cutters can have any desired positions with relation to their forward ends; and that the principles of my invention can be employed in connection with drills of other kinds than those specifically illustrated.

The body parts of the tools above described are, as hereinbefore stated, formed of alloy steel, high-speed steel, high-carbon steel, tool steel, or of air or self-hardening steel; in other words, of an alloy or other material which is susceptible to heat treatment. The working parts of these articles are formed of a hard metal alloy; those containing considerable quantities of tungsten carbide or molybdenum carbide may be specifically mentioned as examples. Such working parts are preliminarily formed as by casting, by molding and sintering, or by grinding; and the body members are shaped as by casting, forging, tooling or grinding. When the separate elements have been so prepared, they may be secured together in working relation in any approved manner, and the composite article so formed then finished by grinding or lapping if this is necessary. By way of example, a brazing or welding method of securing the separate parts together will be described. The working parts and the body are fitted to each other in the manner above explained; the attaching surfaces are cleaned and temporarily fixed in place; and the article is then heated to a brazing temperature. During such heating, oxidation is prevented by maintaining a neutral or reducing atmosphere in blanketing relation to the work, or by the use of a protective covering of melted borax, or the like. When the article has reached a brazing temperature, the brazing metal may be applied to the joints between the body and the working parts and allowed to fill in the intervening spaces. It is not essential that the parts to be brazed shall have been very accurately fitted to each other; on the contrary, the contiguous surfaces are preferably somewhat rough or uneven, and they may even be slightly spaced from each other in order that the union formed by the liquid brazing metal shall have an appreciable thickness, and in order that such union shall be able to absorb the stresses due to the different coefficients of expansion of the materials being joined. I have found that an alloy consisting of 3% aluminum and of 97% of copper makes a satisfactory brazing material, and that a joint formed of this material is elastic or ductile enough to obviate any tendency towards breakage or separation of the connected parts.

As examples of the treatment to which the body may be subjected, the following are mentioned: hardening, tempering, carburizing, case hardening, and nitriding. Such treatment (for various purposes) may be effected prior to, during, or subsequent to the brazing operation. If the body has been annealed, tempered or hardened prior to the brazing, it is possible that this operation will result in some change in the physical properties of such body while at the brazing temperature, but the desired properties can be again imparted or the original condition restored during the cooling which succeeds the brazing and solidifies the metal of the joint. It is also possible to change or alter the original properties of the body by suitably controlling or regulating the cooling or quenching which follows after the application of the braze. Thus, a body which has been annealed prior to the heating for brazing purposes can be re-annealed during the cooling which follows the brazing operation, or during such cooling such a body can be hardened or tempered, if desired. Similarly, a body which has been tempered or hardened before the heating or brazing operations can be hardened or re-hardened, tempered or re-tempered, or annealed during the cooling which follows the brazing operation. It is also possible to allow this cooling to proceed without regard to its effect upon the metal of the body, and to subsequently reheat the article in order that its cooling may be controlled and the desired physical properties imparted. Such operations as carburizing are preferably effected prior to the brazing, but if desired this operation can be effected either during the brazing or subsequent to the cooling which follows the brazing. These post-brazing treatments, of course, involve reheating of the article but it is possible to carry them out without detrimentally affecting the hard metal of the working parts or the bond by which such parts are secured to the body. It will be understood that all heating or other operations effected upon the body are of such a character as to not materially damage the hard metal of the working parts or to change its physical properties. It will also be understood that the heat treatments to which the body is subjected may be intended for developing either the hardness or the tensile or the torsional strength of the metal, as in some cases one of these properties may be preferable to the other. If the heat treatment of the body subsequent to the cooling which follows the brazing is of such a nature as to tend to detrimentally affect the working parts, such parts may be protected during this treatment so that their properties will remain unimpaired. Obviously, the composition and properties of the metal used in the bond between the separate parts can be varied in any manner made necessary by the character of the parts, or by the nature of the treatment to which the body is to be subjected. Finally, it may be stated that my invention contemplates the use of other than welding and brazing processes for securing the parts together; in some cases mechanical securing means will be quite satisfactory.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I, therefore, particularly point out and distinctly claim as my invention:

1. A drill or the like having a cutting end including substantially continuous primary cutting edges which converge forwardly toward the axis of the drill and which are respectively formed in part on a central portion of hardened steel integral with the body of the tool and on an insert of hard non-ferrous metal composition.

2. A drill or the like having a cutting end including substantially continuous primary cutting edges which converge forwardly toward the axis of the drill and which are respectively formed in part on a central portion of hardened steel integral with the body of the tool and on an insert of a metallic carbide composition.

JOSEPH V. EMMONS.